United States Patent
Bloink et al.

(10) Patent No.: US 9,637,168 B2
(45) Date of Patent: May 2, 2017

(54) TIE ROD ARMS AND STEERING ARMS WITH INTEGRATED GREASE SEAL CAPS

(71) Applicant: Hendrickson USA, L.L.C., Itasca, IL (US)

(72) Inventors: Michael P. Bloink, Romeoville, IL (US); Damon E. Dilworth, Channahon, IL (US); Paul D. Elwood, Plainfield, IL (US); Jonathan W. Goding, Joliet, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 8 days.

(21) Appl. No.: 14/725,115

(22) Filed: May 29, 2015

(65) Prior Publication Data
US 2016/0347362 A1 Dec. 1, 2016

(51) Int. Cl.
*B62D 7/16* (2006.01)
*B62D 7/20* (2006.01)
*B62D 7/18* (2006.01)

(52) U.S. Cl.
CPC ..................... *B62D 7/18* (2013.01)

(58) Field of Classification Search
CPC .. B62D 7/18; B60G 2200/44; B60G 2206/50; B60G 2300/14; B60G 2300/38; F16D 2055/0012
USPC .............. 280/93.51, 93.511, 93.512
See application file for complete search history.

(56) References Cited

U.S. PATENT DOCUMENTS

| | | | |
|---|---|---|---|
| 4,718,686 A * | 1/1988 | Dziuba | B62D 5/12 180/435 |
| 6,616,156 B1 | 9/2003 | Dudding et al. | |
| 6,902,176 B2 * | 6/2005 | Gottschalk | B62D 7/18 280/93.512 |
| 6,974,141 B2 * | 12/2005 | Kim | B62D 7/18 280/93.502 |
| 7,530,583 B2 | 5/2009 | Gottschalk | |
| 8,857,833 B2 * | 10/2014 | Deierling | B62D 7/18 280/93.512 |
| 2006/0022420 A1 * | 2/2006 | Pressler | B62D 15/023 280/93.512 |

FOREIGN PATENT DOCUMENTS

CN 103 042 154 A 4/2013

OTHER PUBLICATIONS

Notification of Transmittal of the International Search Report and the Written Opinion of the International Searching Authority for PCT/US2016/021422, dated Jun. 17, 2016.

* cited by examiner

*Primary Examiner* — Toan To
(74) *Attorney, Agent, or Firm* — Cook Alex Ltd.

(57) ABSTRACT

A tie rod arm is provided for incorporation into a vehicle steering assembly. The tie rod arm has a grease cap portion with a steering knuckle connection formation and a grease seal cap. The steering knuckle connection formation is used to connect the tie rod arm to the body of a steering knuckle of the vehicle steering assembly. The grease seal cap receives the lower end of a kingpin of the vehicle steering assembly. The grease cap portion of the tie rod arm is integrally formed with an arm portion, which includes a tie rod connection formation to connect the tie rod arm to a tie rod of the vehicle steering assembly. A steering arm may also or alternatively be connected to the body of the steering knuckle and include an upper grease seal cap, which receives the upper end of the kingpin.

25 Claims, 5 Drawing Sheets

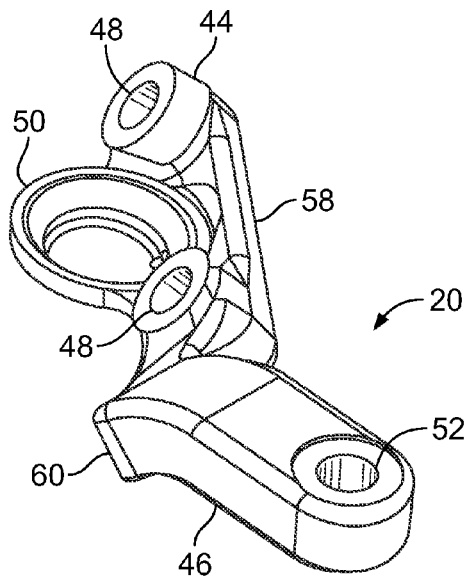
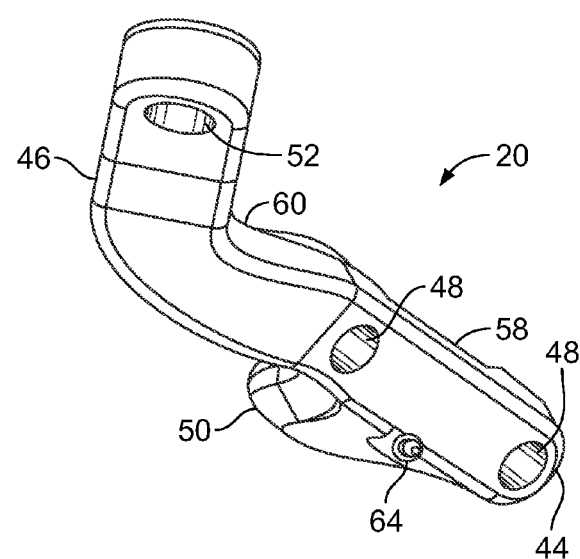
FIG. 4　　　　　　　　　　　FIG. 5
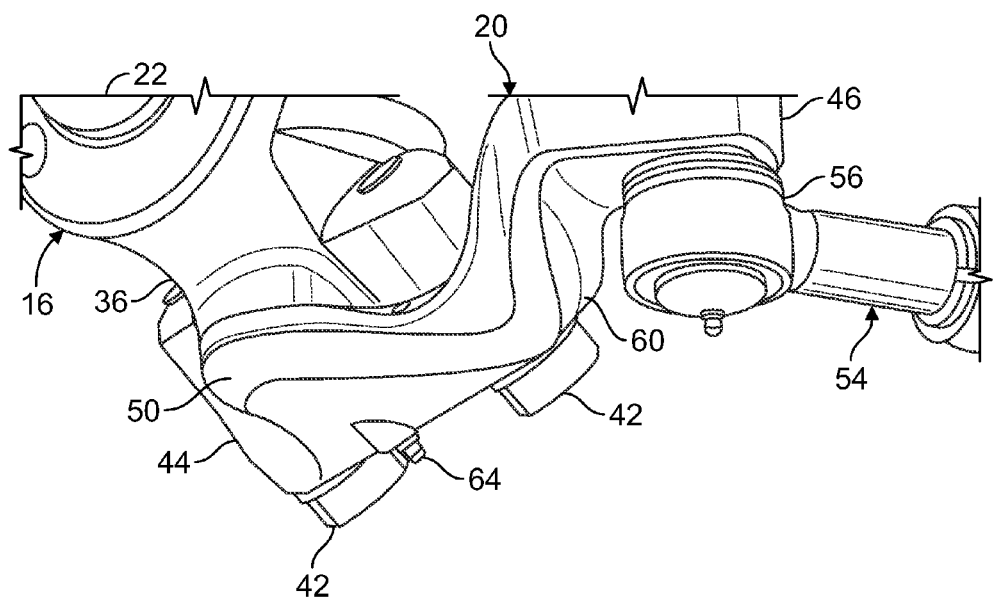
FIG. 6

TIE ROD ARMS AND STEERING ARMS WITH INTEGRATED GREASE SEAL CAPS

BACKGROUND

Field of the Disclosure

The present subject matter relates to multi-piece steering knuckles for steering assemblies of wheeled vehicles. More particularly, the present subject matter relates to a multi-piece steering knuckle having a tie rod arm with an integrated grease seal cap.

Description of Related Art

The use of steering knuckles for carrying wheel assemblies is a long-established practice for providing steerability to vehicle axles. Older steering knuckles were commonly single-piece cast items, which were relatively heavy.

To lower the weight of single-piece steering knuckles, fabricated steering knuckles were introduced. Such fabricated steering knuckles were comprised of two or more pieces that were individually formed (e.g., by forging, casting, machining, or the like) and then secured to each other to form the fabricated knuckle. FIG. 1 illustrates an exemplary fabricated steering knuckle K of the type described in U.S. Pat. No. 6,616,156, which is hereby incorporated herein by reference. The illustrated fabricated steering knuckle K has a first or upper piece U and a second or lower piece L, which are connected together by mechanical fasteners. The two pieces U and L define aligned kingpin bores (with only the upper kingpin bore B being visible), which receive a kingpin P. Each kingpin bore includes an associated grease seal cap, with the upper grease seal cap G receiving an upper end of the kingpin P and the lower grease seal cap C receiving a lower end of the kingpin P. A lubricant is injected into the grease seal caps G and C to lubricate the kingpin P. The lower piece L of the steering knuckle K includes an integrally formed tie rod arm T with a tie rod ball taper R that receives the end E of a tie rod arm A of the steering assembly.

Examples of other fabricated steering knuckles are described in greater detail in U.S. Pat. Nos. 6,902,176 and 7,530,583, both of which are hereby incorporated herein by reference.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately as set forth in the claims appended hereto.

In one aspect, a tie rod arm is provided for use in association with a steering knuckle and a tie rod. The tie rod arm includes an arm portion integrally formed with a grease cap portion. The arm portion has a tie rod connection formation, while the grease cap portion has a grease seal cap. The tie rod arm also includes a steering knuckle connection formation.

In another aspect, a vehicle steering assembly comprises a steering knuckle body, a kingpin, a tie rod arm, and a tie rod. The steering knuckle body defines a kingpin bore in which the kingpin is partially received. The tie rod arm includes an arm portion integrally formed with a grease cap portion. The arm portion has a tie rod connection formation, while the grease cap portion has a grease seal cap. The grease seal cap receives the lower end of the kingpin. The tie rod arm is connected to the arm portion of the tie rod arm at the tie rod connection formation.

In yet another aspect, the steering knuckle of a vehicle steering assembly includes a steering knuckle body and a steering arm. The steering arm extends between an outboard end and an inboard end. The outboard end of the steering arm is connected to an upper portion of a generally vertical face of the knuckle body, while the inboard end of the steering arm includes a steering assembly connection formation. An upper grease seal cap is defined in the steering arm.

BRIEF DESCRIPTION OF THE DRAWINGS

FIG. 4 is a top perspective view of a tie rod arm of the vehicle steering assembly of FIG. 2;

FIG. 5 is a bottom perspective view of the tie rod arm of FIG. 4;

FIG. 6 is a bottom perspective view of the vehicle steering assembly of FIG. 2, along with a tie rod of the vehicle steering assembly;

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Figure 1:
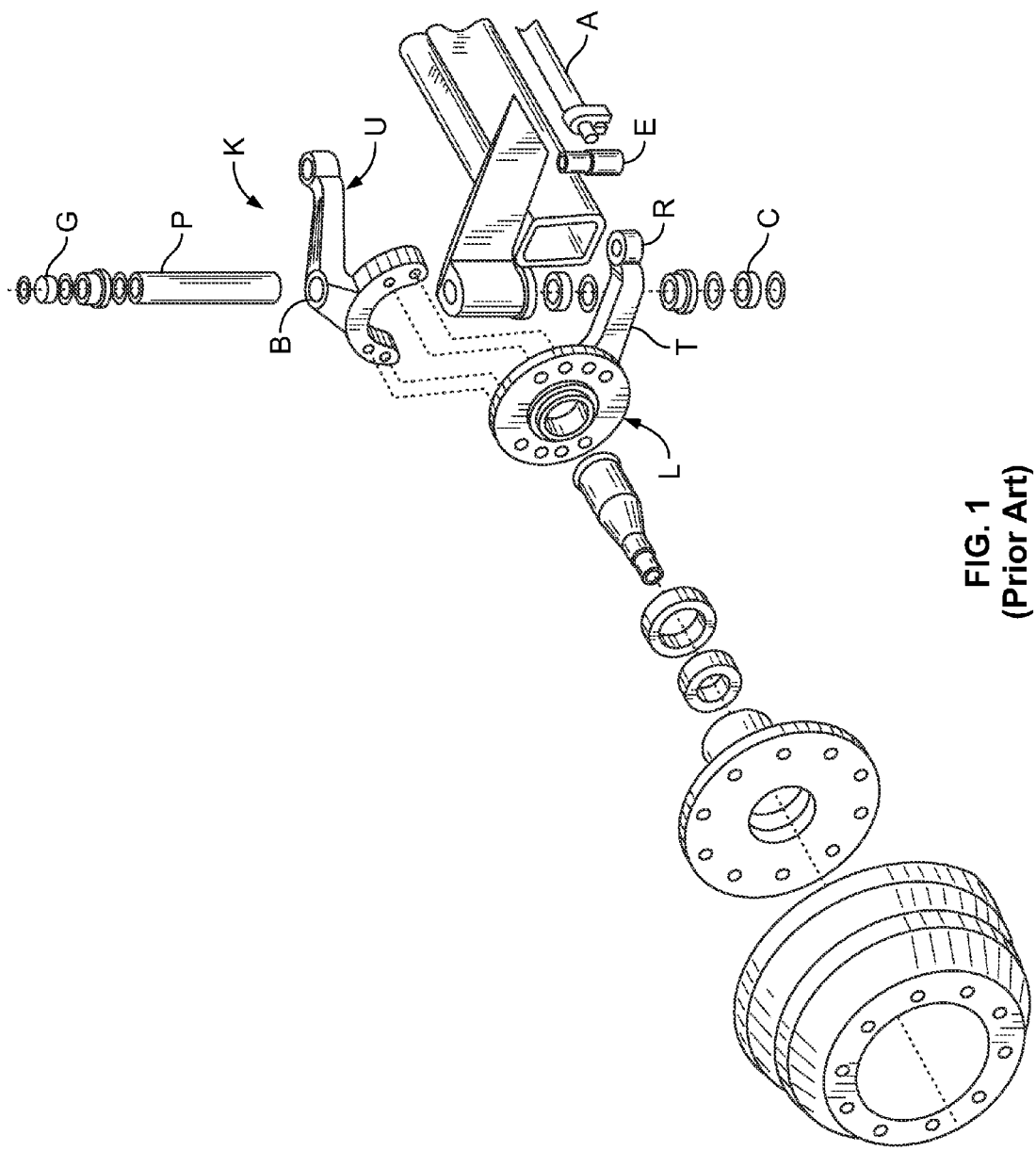
FIG. 1 is a front perspective, exploded view of a fabricated steering knuckle according to known design.
Figure 2:
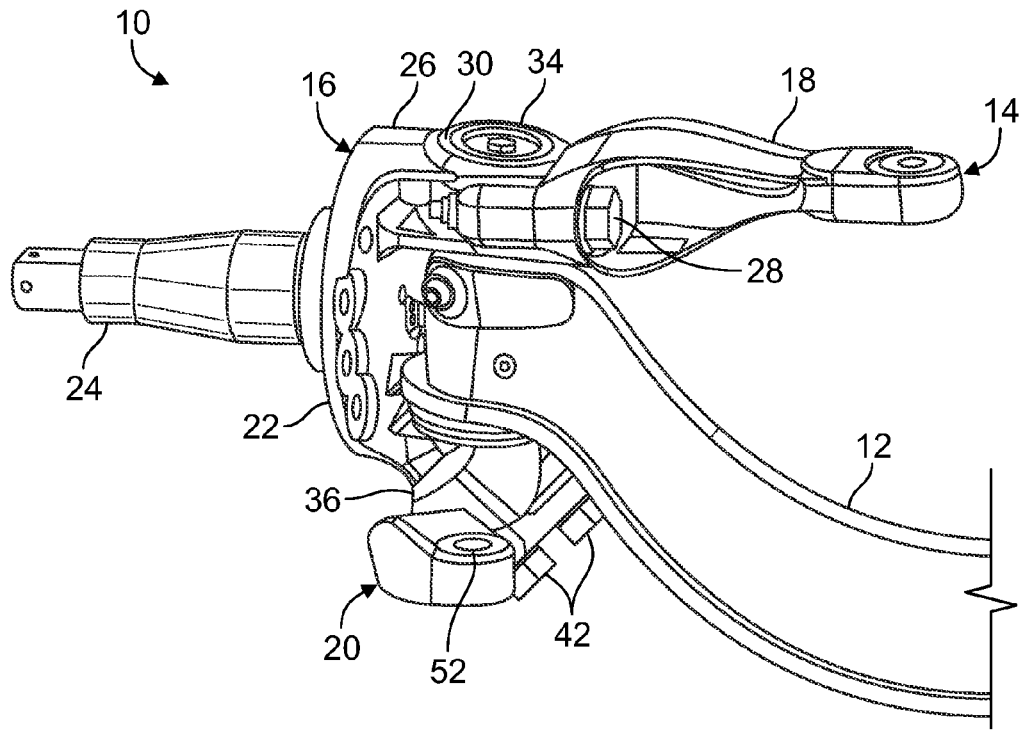
FIG. 2 is a side perspective view of selected components of a vehicle steering assembly according to an aspect of the present disclosure.

FIG. 2 shows selected components of a vehicle steering assembly 10 incorporating aspects of the present disclosure. The steering assembly 10 is associated with an end of a vehicle axle 12, with the opposite end of the axle 12 including a substantially identical or differently configured steering assembly.

The steering assembly 10 of FIG. 2 includes a steering knuckle 14 incorporating aspects of the present disclosure. The steering knuckle 14 (FIGS. 2 and 3) is provided as a fabricated component, with a body 16 secured to an upper piece 18 and a lower piece or tie rod arm 20. The tie rod arm 20 is illustrated in greater detail in FIGS. 3-5.

The body 16 may be variously configured without departing from the scope of the present disclosure, but in the illustrated embodiment, the body 16 has a generally vertical face 22. As used herein, terms of direction (e.g., vertical, horizontal, lateral, and longitudinal) are to be understood with reference to the orientation of the steering assembly 10 (or individual components or portions thereof) when associated with a vehicle axle 12, per conventional design. A spindle 24 may be secured to the generally vertical face 22 of the knuckle body 16 and extending away from the vehicle axle 12 to receive a wheel (not illustrated). The generally vertical face 22 may be provided with a plurality of axially oriented (i.e., parallel to the spindle 24) bores, one of which may receive an S-cam camshaft or another component or mechanical fastener of a vehicle brake assembly (in which case the generally vertical face 22 may be treated as a brake spider), but it is also within the scope of the present disclosure for a separate component to be secured to the generally vertical face 22 to accommodate components of a vehicle brake assembly.

In the illustrated embodiment, the knuckle body 16 also includes a generally horizontal upper face or extension 26 integrally formed therewith and extending from an upper end of the generally vertical face 22 in the direction of the axle 12. The upper piece 18 is secured to the generally horizontal upper extension 26 of the knuckle body 16 (e.g., using one or more mechanical fasteners 28) to define an upper yoke arm. The upper yoke arm defines a generally vertically oriented upper kingpin bore 30, which receives a portion of a kingpin 32 (shown in FIG. 3). The upper kingpin bore 30 also receives at least a portion of an upper grease seal cap 34, in which an upper end of the kingpin 32 is received. In the illustrated embodiment, the upper kingpin bore 30 is associated with the generally horizontal upper extension 26 of the knuckle body 16, but in other embodiments, the generally horizontal upper extension 26 may be differently configured (e.g., smaller) or omitted, thereby associating the upper kingpin bore 30 with the upper piece 18.

Figure 3:
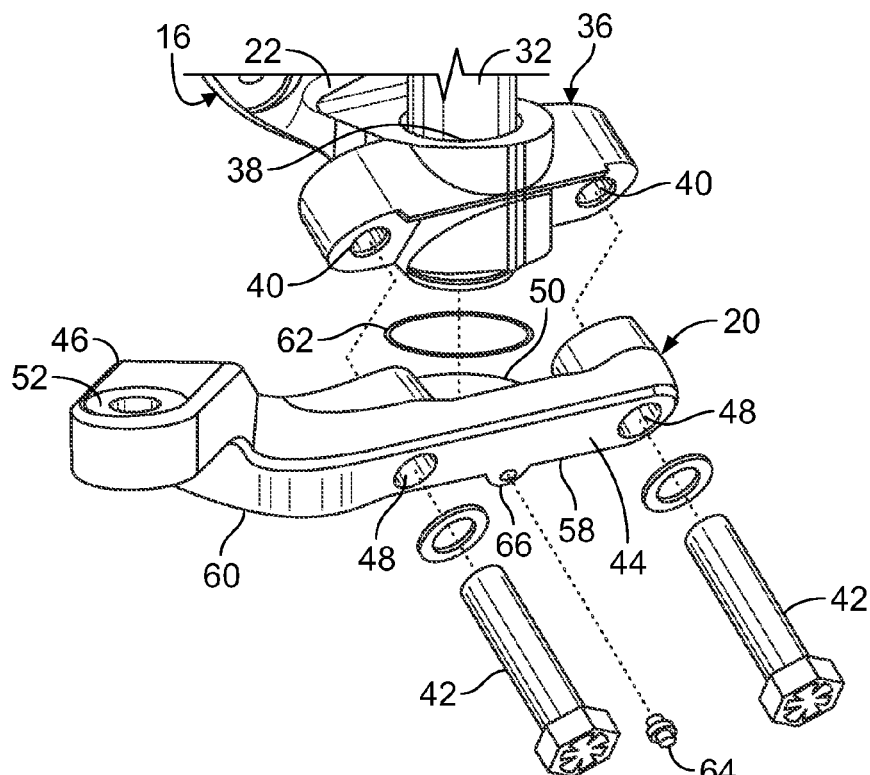
FIG. 3 is a rear perspective, exploded view of selected components of the vehicle steering assembly of FIG. 2.

The illustrated knuckle body 16 further includes a generally horizontal lower face or extension 36 integrally formed therewith and extending from a lower end of the generally vertical face 22 in the direction of the axle 12. Similar to the illustrated generally horizontal upper extension 26, the illustrated generally horizontal lower extension 36 defines a generally vertically oriented lower kingpin bore 38, which is substantially aligned with the upper kingpin bore 30 and receives a portion of the kingpin 32. The illustrated generally horizontal lower extension 36 also includes at least one tie rod arm connection formation 40, as shown in FIG. 3. The tie rod arm connection formation 40 is shown as a bore positioned laterally of the lower kingpin bore 38 and oriented at an angle to vertical (e.g., approximately 45°). If provided as a bore, the tie rod arm connection formation 40 may receive a mechanical fastener 42 that is used to secure the knuckle body 16 to the tie rod arm 20. If the tie rod arm connection formation is differently configured, a different mechanism may be provided to secure the knuckle body 16 to the tie rod arm 20. For example, the tie rod arm connection formation may be provided as a surface that may be welded to a mating surface of the tie rod arm, although it may be preferred for the knuckle body 16 to be removably secured to the tie rod arm 20.

The generally horizontal lower extension 36 is illustrated with a pair of tie rod arm connection formations 40, which are shown as being substantially identical bores that are substantially parallel and positioned on opposite lateral sides of the lower kingpin bore 38. In other embodiments, there may be more or fewer than two tie rod arm connection formations, with the tie rod arm connection formations being identical or differently configured and/or oriented if there are more than one tie rod arm connection formations. A tie rod arm connection formation may be oriented substantially vertically or substantially horizontally and/or may be configured differently than as a bore in other embodiments.

The tie rod arm 20 (FIGS. 4 and 5) has a first or grease cap portion 44 integrally formed with a second or arm portion 46. As used herein, the phrase integrally formed with" refers to the tie rod arm 20 being of a single-piece construction, with the same piece of material being used to form the entire tie rod arm 20, including the grease cap and arm portions 44 and 46. The tie rod arm 20 also includes a steering knuckle connection formation 48 associated with each tie rod arm connection formation 40 of the knuckle body 16. In the illustrated embodiment, the tie rod arm 20 is provided with two steering knuckle connection formations 48 associated with the grease cap portion 44, which are substantially identical, parallel bores that are oriented at the same angle to vertical as the tie rod arm connection formations 40. The illustrated steering knuckle connection formations 48 are spaced on opposite lateral sides of a grease seal cap 50 of the grease cap portion 44 of the tie rod arm 20, having the same spacing as the tie rod arm connection formations 40. By such a configuration, each pair of aligned bores (i.e., one tie rod arm connection formation 40 and an associated steering knuckle connection formation 48) receives a mechanical fastener 42 (e.g., a bolt), which serves to secure the knuckle body 16 to the tie rod arm 20.

Just as the configuration of the tie rod arm connection formations 40 may vary, it should be understood that the configuration of the illustrated steering knuckle connection formations 48 is also merely exemplary. If a tie rod arm connection formation is differently configured, then the associated steering knuckle connection formation may be differently configured as well to better complement the tie rod arm connection formation. For example, while it may be advantageous for the tie rod arm connection formations 40 and steering knuckle connection formations 48 to be provided as aligned pairs of bores when the various components of the vehicle steering assembly 10 are as illustrated, it may be advantageous for the tie rod arm connection formations 40 and steering knuckle connection formations 48 to be differently configured when the various components of a vehicle steering assembly are differently configured. For example, the configuration of the axle may prevent or at least discourage the use of tie rod arm connection formation(s) and steering knuckle connection formation(s) that are configured and oriented as shown in the illustrated embodiment. In other embodiments, rather than being associated with the grease cap portion 44 of the tie rod arm 20, the steering knuckle connection formations 48 may be associated with the arm portion 46. It is also within the scope of the present disclosure for one or more steering knuckle formations to be associated with the arm portion 46 of the tie rod arm 20 and for one or more steering knuckle formations to be associated with the grease cap portion 44.

Figure 7:
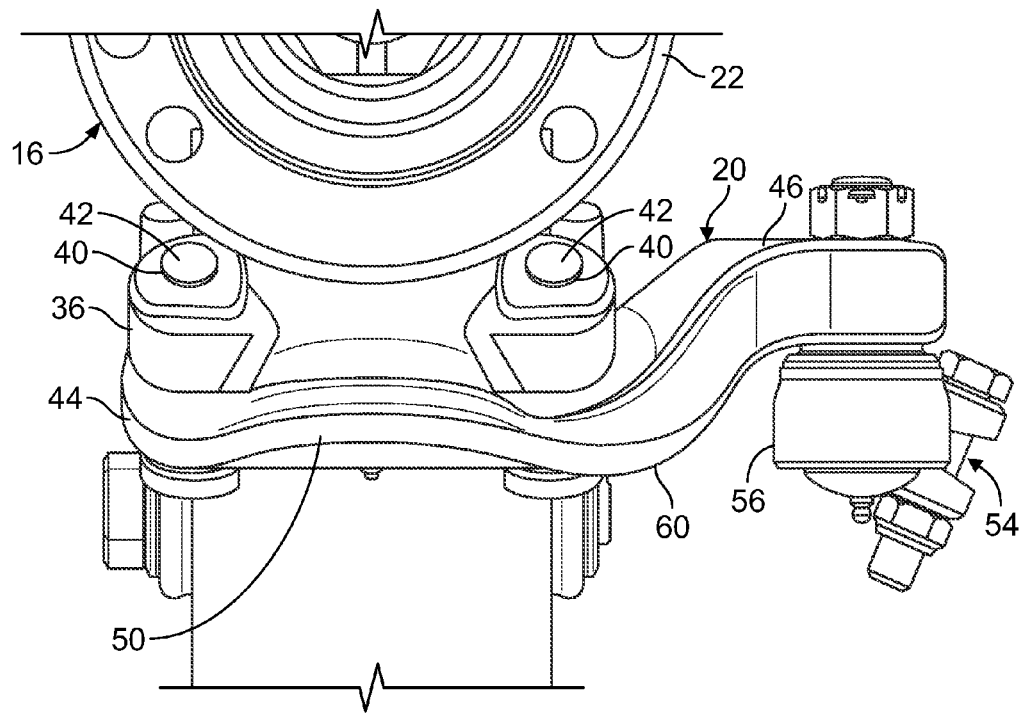
FIG. 7 is a front elevational view of the vehicle steering assembly of FIG. 6.

The arm portion 46 of the tie rod arm 20 includes a tie rod connection formation 52 for connecting a tie rod 54 to the tie rod arm 20. The illustrated tie rod connection formation 52 is shown as a bore or tie rod ball taper, which receives at least a portion of an end 56 of a tie rod 54 (FIGS. 6 and 7), such as a ball joint. In other embodiments, the tie rod connection formation 52 may be differently configured depending on the configuration of the tie rod end to be associated therewith.

The grease cap portion 44 of the tie rod arm 20 comprises a body 58 integrally formed with the grease seal cap 50. The illustrated arm portion 46 and body 58 of the grease cap portion 44 are generally linear, with the arm portion 46 defined in a plane oriented at an angle to a plane in which the body 58 of the grease cap portion 44 is defined. The arm portion 46 may be defined in a generally horizontal plane, while the body 58 of the grease cap portion 44 is defined in a plane oriented at an angle to horizontal and vertical. In the illustrated embodiment, the steering knuckle connection formations 48 are defined in the body 58 of the grease cap portion 44, with the body 58 being oriented at an approximately 45° angle to match the orientation of the surface of the knuckle body 16 that is secured to the tie rod arm 20. In other embodiments, the body 58 of the grease cap portion 44 may be oriented at a different angle (including the possibility of a compound angled joint), preferably at an angle that matches the angle at which the surface of the knuckle body 16 that is secured to the tie rod arm 20 is oriented for better securing the knuckle body 16 to the tie rod arm 20.

If the tie rod arm 20 has grease cap and arm portions 44 and 46 that are oriented at an angle to each other, the tie rod arm 20 may include an angled section 60 integrally formed with the grease cap and arm portions 44 and 46 to serve as a transition between the grease cap and arm portions 44 and 46. In the illustrated embodiment, the angled section 60 also provides the tie rod arm 20 with a generally dogleg shape (i.e., with the arm portion 46 oriented at an obtuse angle, such as approximately 135 degrees, to the body 58 of the grease cap portion 44 when viewed from above). In particular, the grease cap portion 44 is oriented substantially longitudinally (i.e., in the fore-aft direction of the vehicle) or generally perpendicularly to the axle 12, with the arm portion 46 oriented at an angle to the longitudinal direction of the vehicle when the spindle 24 is oriented parallel to the axle 12.

The lower end of the kingpin 32 extends out of the lower kingpin bore 38 (FIG. 8), to be received by the grease seal cap 50. The grease seal cap 50 is preferably oriented in a substantially horizontal plane, similar to the arm portion 46 of the tie rod arm 20 (so as to align the grease seal caps 34 and 50), to receive the lower end of the kingpin 32. Accordingly, if the arm portion 46 of the tie rod arm 20 is oriented at an angle to the body 58 of the grease cap portion 44, then the grease seal cap 50 may be similarly oriented at an angle to the body 58 of the grease cap portion 44 to place both the arm portion 46 and the grease seal cap 50 in substantially horizontal planes, as in the illustrated embodiment. It is also within the scope of the present disclosure for the grease seal cap 50 to be oriented in a non-horizontal plane, which may be necessary to accommodate a non-vertical kingpin 32.

Figure 8:
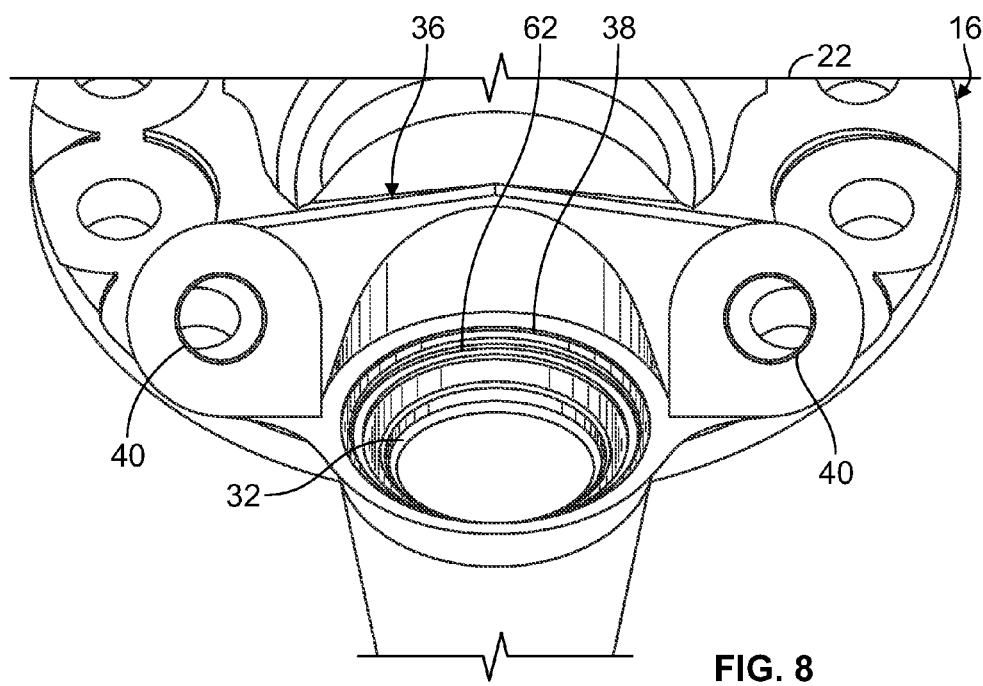
FIG. 8 is a rear perspective view of the vehicle steering assembly of FIG. 2, with selected components omitted for illustrative purposes.

The grease seal cap 50 may be variously configured without departing from the scope of the present disclosure. For example, the grease seal cap 50 may be configured to cooperate with an O-ring 62 or similar component (FIG. 3), which seals the interface between the grease seal cap 50 and the bottom end of the kingpin 32 (FIG. 8). Additionally, in the illustrated embodiment, the grease seal cap 50 is provided with a zerk fitting or grease fitting 64 (FIG. 3), which is partially received within a bore 66 that opens into the grease seal cap 50 and is oriented parallel to the steering knuckle connection formations 48. If provided, the zerk fitting 64 allows a lubricant to be injected into the grease seal cap 50 to lubricate the kingpin 32. In other embodiments, a zerk fitting (if provided) may be oriented at a different angle than the steering knuckle connection formation(s). The upper grease seal cap 34 may also include an associated zerk fitting for lubricating the kingpin 32.

Figure 9:
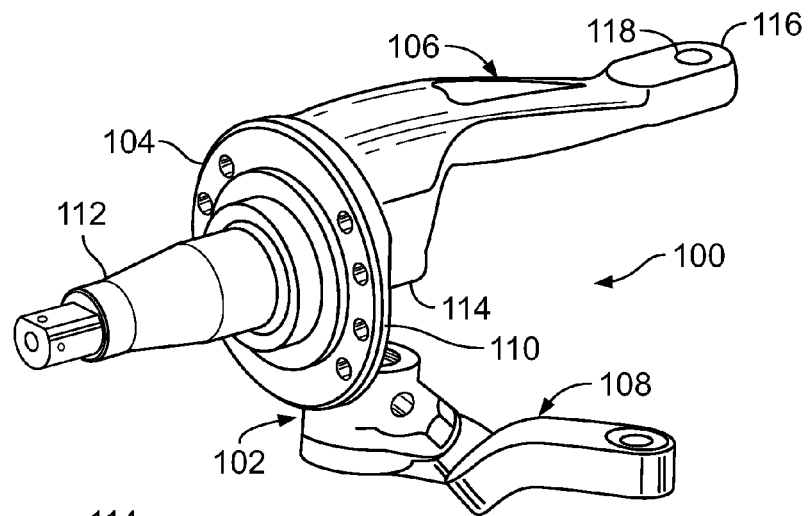
FIG. 9 is a front perspective view of selected components of an alternative embodiment of a vehicle steering assembly according to an aspect of the present disclosure.
Figure 10:
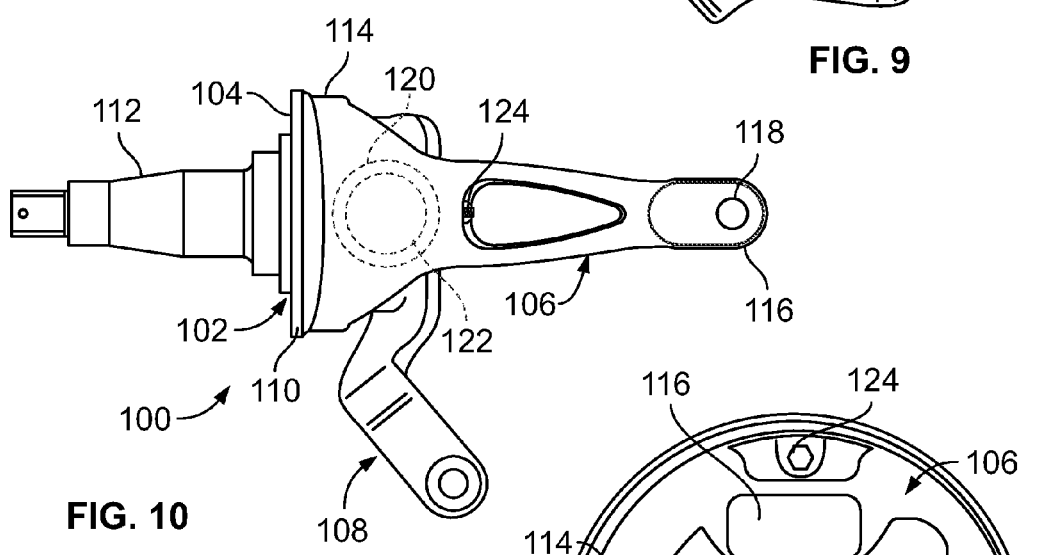
FIG. 10 is a top plan view of the vehicle steering assembly components of FIG. 9.
Figure 11:
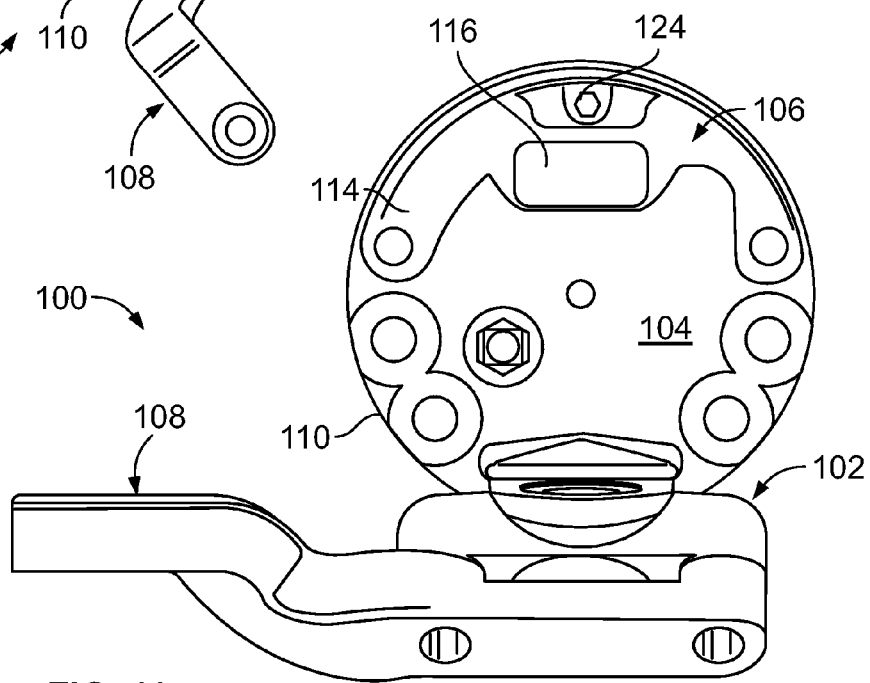
FIG. 11 is a rear elevational view of the vehicle steering assembly components of FIG. 9.

FIGS. 9-11 illustrate selected components of an alternative embodiment of a vehicle steering assembly 100 incorporating aspects of the present disclosure. The vehicle steering assembly 100 of FIGS. 9-11 includes a steering knuckle 102 that is provided as a fabricated component, with a body 104 secured to an upper piece or steering arm 106. The steering knuckle 102 is illustrated as being connected to a lower piece or tie rod arm 108, which may be provided according to the foregoing description of the tie rod arm 20 and associated lower extension 36 of the embodiment of FIGS. 2-8. However, in other embodiments, the steering knuckle 102 may be differently configured, such as being provided with an integrally formed tie rod arm.

The body 104 may be variously configured without departing from the scope of the present disclosure, but in the illustrated embodiment, the body 104 has a generally vertical face 110, with a spindle 112 secured or otherwise associated with the generally vertical face 110 and extending away therefrom in an outboard direction to receive a wheel (not illustrated). The generally vertical face 110 may be provided with a plurality of axially oriented bores, one of which may receive an S-cam camshaft or another component or mechanical fastener of a vehicle brake assembly (in which case the generally vertical face 110 may be treated as a brake spider), but it is also within the scope of the present disclosure for a separate component to be secured to the generally vertical face 110 to accommodate components of a vehicle brake assembly.

In contrast to the steering knuckle 14 illustrated in FIG. 2, the knuckle body 104 of FIGS. 9-11 omits a generally horizontal upper face or extension integrally formed at an upper portion or end of the generally vertical face 110 in the inboard direction. Instead the steering knuckle 102 includes a larger upper piece or steering arm 106 that may be directly secured to generally vertical face 110, rather than being secured to an upper extension of the knuckle body 104. The larger steering arm 106 extends between an outboard end 114 and an inboard end 116. The outboard end 114 is connected to an upper portion or end of the generally vertical face 110 of the knuckle body 104 (e.g., by mechanical fasteners or in any other suitable manner), while the inboard end 116 includes a steering assembly connection formation 118 for connecting the steering arm 106 to another component of the vehicle steering assembly 100 (not illustrated). The illustrated steering assembly connection formation 118 is provided as a bore or tie rod ball taper, which receives at least a portion of a ball joint or the like of another component of the vehicle steering assembly 100. In other embodiments, the steering assembly connection formation 118 may be differently configured, depending on the configuration of the component to be connected to the steering arm 106.

On account of the steering arm 106 being larger than the upper piece 18 illustrated in FIG. 2, additional components and/or features may be incorporated into the steering arm 106. In particular, a generally vertically oriented upper kingpin bore 120 (FIG. 10) may be defined in the steering arm 106 adjacent to the outboard end 114, which receives a portion of a kingpin (not illustrated). An upper grease seal cap 122 (FIG. 10) is also defined within the upper kingpin bore 120, with an upper end of the kingpin being received by the upper grease seal cap 122. The upper grease seal cap 122 may have the same or similar configuration as one of the grease seal caps 34 and 50 of the embodiment of FIGS. 2-8 or may be differently configured without departing from the scope of the present disclosure. In the illustrated embodiment, the upper surface or end of the steering arm 106 is closed directly above the upper kingpin bore 120, with a zerk fitting or grease fitting 124 partially received within a bore that opens into the upper grease seal cap 122 to allow a lubricant to be injected in the upper grease seal cap 122 to lubricate the kingpin. An O-ring or similar annular seal (not illustrated) may be received within the upper kingpin bore 120 to seal the interface between the upper grease seal cap 122 and the upper end of the kingpin.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A tie rod arm for use in association with a steering knuckle and a tie rod, comprising:
    an arm portion including a tie rod connection formation;
    a grease cap portion integrally formed with the arm portion and including a grease seal cap integrated into the tie rod arm; and
    a steering knuckle connection formation.

2. The tie rod arm of claim 1, wherein
    the grease cap portion comprises a body integrally formed with the grease seal cap,
    the arm portion is generally linear, and
    the body of the grease cap portion is generally linear.

3. The tie rod arm of claim 2, wherein the arm portion is defined in a plane oriented at an angle to a plane in which the body of the grease cap portion is defined.

4. The tie rod arm of claim 1, further comprising an angled section integrally formed with the grease cap portion and the arm portion and configured to orient the arm portion at an angle with respect to the grease cap portion.

5. The tie rod arm of claim 1, wherein the steering knuckle connection formation is associated with the grease cap portion.

6. The tie rod arm of claim 1, wherein the steering knuckle connection formation comprises a bore configured to receive at least a portion of a mechanical fastener.

7. The tie rod arm of claim 1, further comprising a second steering knuckle connection formation.

8. The tie rod arm of claim 7, wherein the steering knuckle connection formations are substantially identical.

9. The tie rod arm of claim 7, wherein the steering knuckle connection formations comprise substantially parallel bores each configured to receive at least a portion of a mechanical fastener.

10. The tie rod arm of claim 7, wherein the steering knuckle connection formation is positioned on a lateral side of the grease seal cap and the second steering knuckle connection formation is positioned on an opposite lateral side of the grease seal cap.

11. The tie rod arm of claim 1, wherein the steering knuckle connection formation is configured to be removably connected to a lower portion of a steering knuckle.

12. The tie rod arm of claim 1, wherein the steering knuckle connection formation is configured to be connected to an inclined surface of a steering knuckle.

13. A vehicle steering assembly comprising:
    a steering knuckle body defining a kingpin bore,
    a kingpin partially received within the kingpin bore,
    a tie rod arm comprising
        an arm portion including a tie rod connection formation, and
        a grease cap portion integrally formed with the arm portion, including a grease seal cap receiving a lower end of the kingpin, and connected to the steering knuckle body; and
    a tie rod connected to the arm portion of the tie rod arm at the tie rod connection formation.

14. The vehicle steering assembly of claim 13, wherein
    the grease cap portion of the tie rod arm comprises a body integrally formed with the grease seal cap,
    the arm portion of the tie rod arm is generally linear, and
    the body of the grease cap portion of the tie rod arm is generally linear.

15. The vehicle steering assembly of claim 14, wherein the arm portion of the tie rod arm is defined in a plane oriented at an angle to a plane in which the body of the grease cap portion of the tie rod arm is defined.

16. The vehicle steering assembly of claim 13, wherein the tie rod arm further comprises an angled section integrally formed with the grease cap portion and the arm portion and configured to orient the arm portion at an angle with respect to the grease cap portion.

17. The vehicle steering assembly of claim 13, wherein the grease cap portion of the tie rod arm includes a steering knuckle connection formation.

18. The vehicle steering assembly of claim 17, further comprising a mechanical fastener connecting the steering knuckle body to the tie rod arm, wherein the steering knuckle connection formation comprises a bore receiving a portion of the mechanical fastener.

19. The vehicle steering assembly of claim 17, further comprising a second mechanical fastener connecting the steering knuckle body to the tie rod arm, wherein the tie rod arm includes a second steering knuckle connection formation receiving a portion of the second mechanical fastener.

20. The vehicle steering assembly of claim 19, wherein the steering knuckle connection formations are substantially identical.

21. The vehicle steering assembly of claim 19, wherein the steering knuckle connection formations comprise substantially parallel bores.

22. The vehicle steering assembly of claim 19, wherein the steering knuckle connection formation is positioned on a lateral side of the grease seal cap and the second steering knuckle connection formation is positioned on an opposite lateral side of the grease seal cap.

23. A steering knuckle of a vehicle steering assembly, comprising:
    a steering knuckle body including a generally vertical face; and
    a steering arm extending between an outboard end connected to an upper portion of the generally vertical face and an inboard end including a steering assembly connection formation, wherein an upper grease seal cap is integrated into the steering arm.

24. The steering knuckle of claim 23, further comprising a tie rod arm including
    an arm portion including a tie rod connection formation, and
    a grease cap portion integrally formed with the arm portion, including a lower grease seal cap, and connected to the steering knuckle body.

25. The steering knuckle of claim 23, wherein
the steering arm defines an upper kingpin bore, and
an upper surface of the steering arm positioned directly above the upper kingpin bore is closed.

* * * * *